(12) United States Patent
Kim et al.

(10) Patent No.: US 9,836,141 B2
(45) Date of Patent: Dec. 5, 2017

(54) INPUT/OUTPUT DEVICE

(71) Applicant: LG ELECTRONICS INC., Seoul (KR)

(72) Inventors: Hyunseok Kim, Seoul (KR); Hoil Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/015,368

(22) Filed: Feb. 4, 2016

(65) Prior Publication Data

US 2016/0231832 A1 Aug. 11, 2016

(30) Foreign Application Priority Data

Feb. 10, 2015 (KR) .................. 10-2015-0020358

(51) Int. Cl.
*G06F 3/0362* (2013.01)
*G06F 3/03* (2006.01)

(52) U.S. Cl.
CPC .......... *G06F 3/0362* (2013.01); *G06F 3/0312* (2013.01)

(58) Field of Classification Search
CPC .............................. G06F 3/0362; G06F 3/0312
See application file for complete search history.

(56) References Cited

U.S. PATENT DOCUMENTS

| | | | |
|---|---|---|---|
| 6,642,919 B1* | 11/2003 | Jaeger | G06F 1/1601 345/1.2 |
| 6,968,508 B2 | 11/2005 | Lucaci et al. | |
| 7,671,851 B1 | 3/2010 | Pryor | |
| 9,256,218 B2* | 2/2016 | Robinson | G05B 19/0425 |
| 2006/0092129 A1* | 5/2006 | Choquet | G05G 1/105 345/156 |
| 2006/0219156 A1* | 10/2006 | Denton | G05G 1/105 116/310 |
| 2008/0023309 A1* | 1/2008 | Montalvo | G05G 1/105 200/332 |
| 2008/0211779 A1* | 9/2008 | Pryor | G01C 21/3664 345/173 |
| 2014/0168132 A1 | 6/2014 | Graig et al. | |
| 2017/0052617 A1* | 2/2017 | Okuzumi | G06F 3/044 |

FOREIGN PATENT DOCUMENTS

| | | |
|---|---|---|
| CN | 101377711 | 3/2009 |
| CN | 103984473 | 8/2014 |
| EP | 2 042 971 | 4/2009 |

OTHER PUBLICATIONS

European Search Report dated Jul. 11, 2016 issued in Application No. 16154302.0.
Chinese Office Action dated Jul. 19, 2017 issued in Application No. 201610066637.X.

\* cited by examiner

*Primary Examiner* — Lixi C Simpson
(74) *Attorney, Agent, or Firm* — KED & Associates, LLP (57) ABSTRACT

An input/output device is provided. The input/output device may include an output device having a display surface, on which characters or symbols are displayed, a body rotatably provided above the display surface, a body through-hole formed in the body to allow the display surface to be visible from an outside of the body, a signal generation device configured to generate a control signal according to whether the body is rotated, and a controller configured to control the output device based on the control signal input from the signal generation device.

14 Claims, 6 Drawing Sheets

INPUT/OUTPUT DEVICE

CROSS-REFERENCE TO RELATED APPLICATION

This application claims the benefit of Korean Patent Application No. 10-2015-0020358, filed on Feb. 10, 2015, which is incorporated herein by reference as if fully set forth herein.

BACKGROUND

1. Field

Embodiments relate to an input/output device.

2. Background

Electronic appliances, such as, e.g., laundry treatment apparatuses capable of performing washing of laundry, drying of laundry, or both washing and drying of laundry, may include an input/output device, through which a user inputs control commands to the electronic appliance.

Input/output devices generally may include a display device, which displays control commands that the user may select, and an input device, which allows the user to select the control commands displayed on the display device.

In addition, input/output devices arrange the display device and the input device to be separated from each other in a width direction of the electronic appliance, or to be separated from each other in the height direction of the electronic appliance. In other words, it has been difficult to locate the input device above a display surface, or a surface of a display region, of the display device on which information is displayed.

Therefore, input/output devices having the above-described configuration require a wide space for installation of the input/output device, and there is a limitation in a design of the input/output device.

BRIEF DESCRIPTION OF THE DRAWINGS

The embodiments will be described in detail with reference to the following drawings in which like reference numerals refer to like elements wherein.

DETAILED DESCRIPTION

Figure 1:
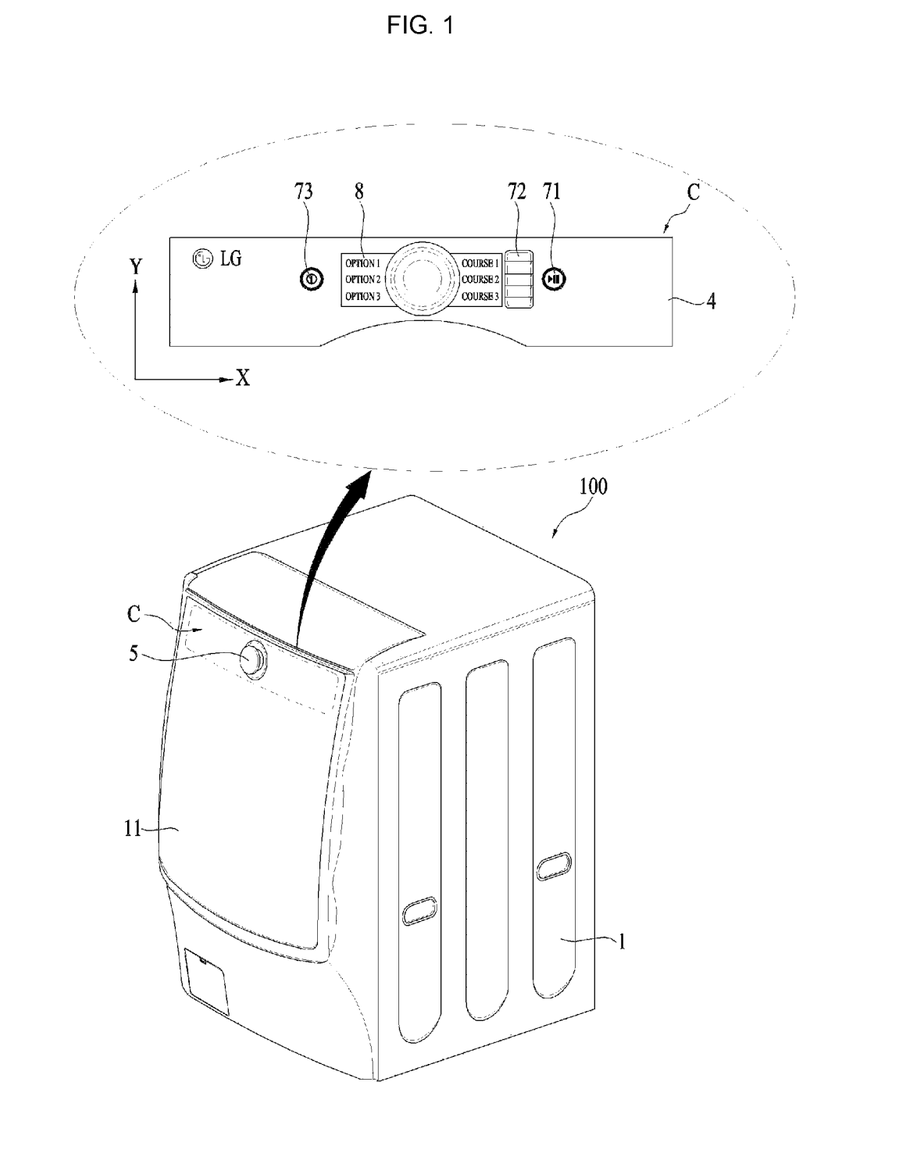
FIG. 1 is a view of a laundry treatment apparatus including an input/output device according to an embodiment.

FIG. 1 is a view of a laundry treatment apparatus 100 including an input/output device or module C according to an embodiment. The laundry treatment apparatus 100 may include a cabinet 1 defining the external appearance, a drum placed inside the cabinet 1 to provide a space in which laundry is accommodated, a door 11 provided at the cabinet 1 to communicate an interior of the drum with an exterior of the cabinet 1, and a drive unit or driver to rotate the drum. The input/output device C may be fixed to the door 11, or may be fixed to the cabinet 1 at a position above or below the door 11 separately from the door 11.

The input/output device C may enable display of control commands that a user may select, and/or a selection of displayed control commands, and/or an execution of a selected control command. In addition, the input/output device C may display an operating state of the laundry treatment apparatus 100 or information related to a selected control command while the laundry treatment apparatus 100 is executing the selected control command.

Figure 2:
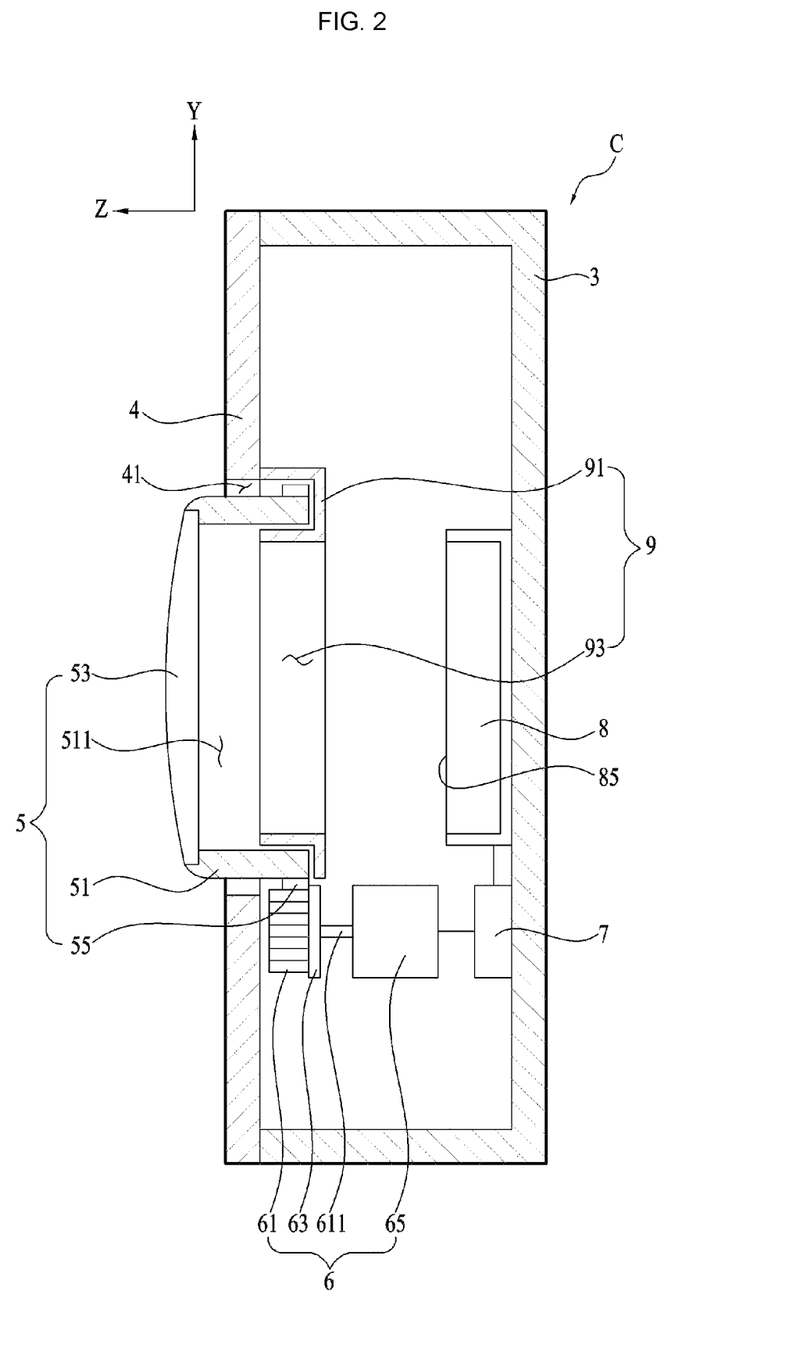
FIG. 2 is a sectional view of the input/output device according to the embodiment.

To implement the functions described above, the input/output device C may include an output device or display 8, which may display characters or symbols, and an input device or module 5, which may allow the user to select a control command displayed on the output device 8. The output device 8 and the input device 5 may be coupled to the laundry treatment apparatus 100 via a housing. As illustrated in FIG. 2, the housing may include a first housing 3, to which the output device 8 may be fixed, and a second housing 4, to which the input device 5 may be rotatably coupled.

When the first housing 3 and the second housing 4 define an external appearance of the input/output device C and respective components, or elements of the input/output device C are accommodated in the first housing 3 and the second housing 4, the input/output device C according to the embodiment may be easily coupled to various apparatuses, which may include the laundry treatment apparatus 100.

Provided inside the housings 3 and 4 may be a support unit or support 9, which may rotatably support the input device 5, a signal generation unit or device 6, which may generate a control signal when the input device 5 is rotated, and a controller 7, which may control the output device 8 in response to the control signal transmitted from the signal generation device 6.

The second housing 4 may be formed of a material that is capable of transmitting light, in order to enable information, such as, e.g. a control command indicated using characters or symbols, displayed on the output device 8 fixed to the first housing 3 to be visible from an exterior of the second housing 4. Although an entirety of second housing 4 may be formed of a translucent material, alternatively, only a region of the second housing 4 at which the output device 8 may be projected on the second housing 4 may be formed of a translucent material.

In order to rotatably couple the input device 5 to the second housing 4, the second housing 4 may have a through-hole 41, into which the input device 5 may be inserted. However, when the input/output device C according to the embodiment is provided on the door 11 and the door 11 is formed of a material capable of transmitting light, the second housing 4 may be replaced with a front surface of the door 11.

Figure 3A:
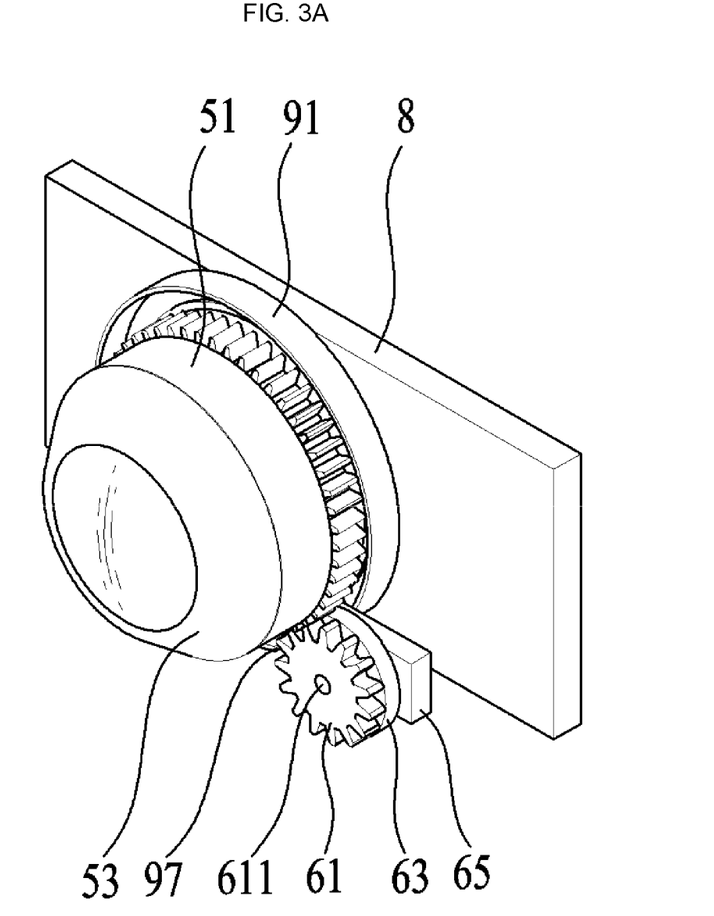
FIGS. 3A-3B are perspective views of the input/output device with a housing omitted.
Figure 3B:
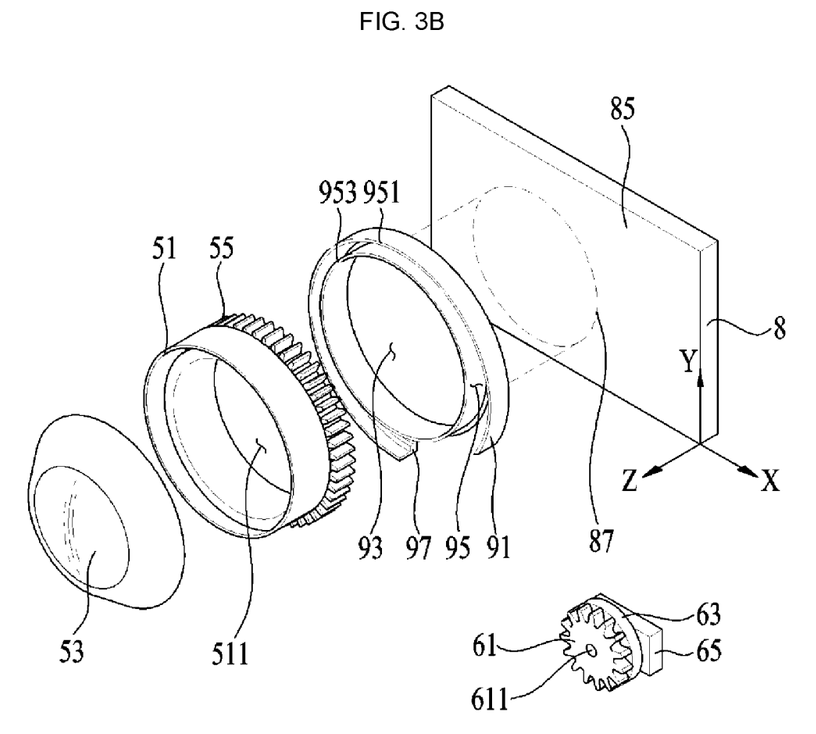

As illustrated in FIGS. 3A and 3B, the input device 5 may include a body 51, which may be rotatably supported in the through-hole 41 by the support 9, and a body through-hole 511 formed in the body 51 to extend in a height direction Z of the body 51. The body 51 may have a cylindrical shape, and a driving gear 55 may be provided on an outer circumferential surface of the body 51 to transmit torque from the body 51 to the signal generator 6. The body through-hole 511 may be a passage through which light emitted from the output device 8 may be discharged to or emitted out an exterior of the body 51. A window 53 formed of a translucent material may be provided in the body through-hole 511.

As illustrated in FIG. 3B, the support 9 may include a support body 91 located between the input device 5 and the output device 8, a support body through-hole 93 formed in the support body 91, and a guide 95 in which the body 51 may be accommodated. The support body 91 may need to be fixed to at least one of the first housing 3 and the second housing 4. FIGS. 2 and 3A illustrate the support body 91 fixed to the first housing 3.

The guide 95 may include a first flange 951 configured to couple the support body 91 and the first housing 3 to each other, and a second flange 953 spaced apart from the first flange 951 toward the center of the support body throughhole 93 by a prescribed or predetermined distance. An end of the body 51, for example, the end of the body 51 having no window, may be inserted into an accommodation recess formed between the first flange 951 and the second flange 953. When the body 51 of the input device 5 has a cylindrical shape, at least one of the first flange 951 and the second flange 953 may have a cylindrical shape.

To allow the support 9 to more stably support the body 51 of the input device 5, a length of the second flange 953 may be determined to allow the second flange 953 to be inserted into the body through-hole 511. The first flange 951 may have a communication portion 97, which may allow the driving gear 55, located in the accommodation recess between the first flange 951 and the second flange 953, to be exposed to the exterior of the first flange 951. The communication portion 97 may have any shape so long as it may allow a portion of the driving gear 55 located in the accommodation recess to be exposed to the exterior of the first flange 951. FIG. 3B illustrates the communication portion 97 having a slit form.

FIGS. 3A and 3B illustrate the first flange 951 and the second flange 953 formed into a cylindrical shape, but embodiments are not limited thereto. That is, each of the flanges 951 and 953 may be configured as a plurality of bosses protruding from the support body 95. The respective bosses forming the first flange 951 may be provided so as to accommodate the outer circumferential surface of the body 51, and the respective bosses forming the second flange 953 may be provided so as to be inserted into the body throughhole 511.

The signal generation device 6, which generates a control signal when the body 51 is rotated, may include a driven gear 61 configured to be engaged with the driving gear 55, and a signal generator 65, which may generate a control signal when a shaft 611 of the driven gear 61 is rotated. The signal generator 65 may generate a signal whenever the shaft 611 is rotated by a predetermined reference angle, and may transmit the control signal to the controller 7. The signal generator 65 may allow the controller 7 to determine whether or not the body 51 is rotated, or the rotation angle of the body 51.

The output device 8, such as, e.g. an LCD panel or an LED panel, may transmit a control command or information, displayed as characters or symbols by the controller 7, to the user. The output device 8 may include a display surface 85 on which information may be displayed. The display surface 85 may need to face the second housing 4.

Figure 4:
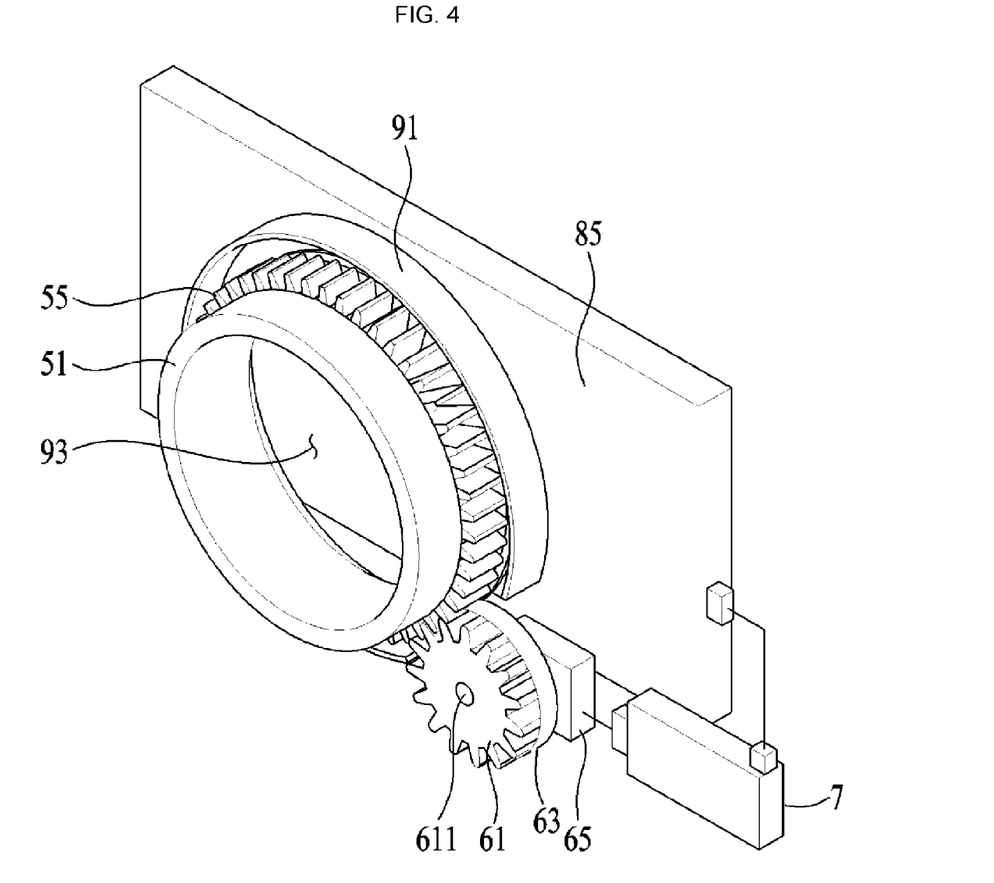
FIG. 4 is a view of a coupling of an input device, a signal generation device, and an output device provided in the input/output device.

As illustrated in FIG. 4, in the input/output device C having the above-described configuration, the signal generation device 6 may transmit a control signal to the controller 7 whenever the input device 5 is rotated by a reference angle, and the controller 7 may display a plurality of control commands stored in the laundry treatment apparatus 100 one by one on the output device 8 according to a predetermined sequence whenever the control signal is input to the controller 7.

In addition, if the input/output device C having the above-described configuration displays one or more control commands stored in the laundry treatment apparatus 100 on the output device 8, the controller 7 may differentiate the brightness or size of a corresponding one of the control commands, displayed as characters or symbols on the output device 8, from other control commands whenever the input device 5 is rotated by a reference angle so as to sequentially highlight the control command that the user may select.

The input/output device C having only the above-described configuration may require a separate input device that selects any one of a plurality of selectable control commands, or requests an execution of a control command. Thus, the second housing 4 may further include a first selector 71, which may request the execution of the control command displayed on the output device 8, and a second selector 72, which may enable a selection of a control command displayed on the output device 8 and a selection of an option corresponding to a selected control command, for example, a control command that may be added to the selected control command, as illustrated in FIG. 1.

Alternatively, the signal generation device 6 may include a first generator, which may generate a control signal whenever the body 51 is rotated by a reference angle, and a second generator, which may generate a control signal when pressure is applied to the body 51 in a direction in which the output device 8 is located (−Z axis). With this configuration or embodiment, at least one of the first selector 71 and the second selector 72 described above may be omitted, which may minimize an installation space of the input/output device C.

In this case, the first generator may determine whether or not the driven gear 61 is rotated via the shaft 611, thereby determining whether or not the body 51 is rotated by a predetermined angle. The second generator may determine whether or not pressure is applied to the shaft 611, thereby determining whether or not pressure is applied to the body 51.

To allow the shaft 611 to be pushed toward the output device 8 when the body 51 is pushed toward the output device 8, a gear support 63 may be provided on an underside of the driven gear 61 and may serve to move the shaft 611 toward the output device 8 when the driving gear 55 is moved toward the output device 8.

To operate the laundry treatment apparatus 100 illustrated in FIG. 1, the user may supply electric power to the laundry treatment apparatus 100 via a power input 73. The power input 73 may serve not only to supply electric power to the controller 7 and the output device 8 provided in the input/output device C, but also to supply electric power to respective components of the laundry treatment apparatus 100 that may require a supply of electric power. The power input 73 may be integrated with the input/output device C, or may be provided separately from the input/output device C.

When electric power is supplied to the laundry treatment apparatus 100, the controller 7 may display on the output device 8 one or more control commands stored in the laundry treatment apparatus 100, and may highlight each control command that the user may select whenever the body 51 is rotated by a predetermined angle, or may sequentially highlight selectable control commands whenever the body 51 is rotated by a predetermined angle.

If the input/output device C includes the first selector 71 and the second selector 72, the user may push the first selector 71 when a desired control command is displayed on the output device 8, thereby inputting a command to execute the desired control command. In addition, the user may select a control command or option that may be added to the selected control command via the second selector 72, and may input a command to execute the selected control command or option to the controller 7 via the first selector 71.

Alternatively, if the input/output device C including the signal generation device 6 includes both the first generator and the second generator, the user may rotate the body 51 so that a desired control command is displayed on the output device 8, and may push the body 51 to input a command to select or execute the desired control command displayed on the output device 8 to the controller 7.

The input/output device C may be configured to allow the user to check information displayed on the output device 8 through the body through-hole 511 formed in the input device 5. Accordingly, the controller 7 may control the output device 8 so that the control commands stored in the laundry treatment apparatus 100 may be displayed in a region outside the projection surface 87, as illustrated in FIG. 3B, onto which the body through-hole 511 may be projected of the display surface 85 of the output device 8, and thus, information regarding the execution of a selectable control command or a selected control command may be displayed on the projection surface 87.

The information displayed on the projection surface 87 may include, for example, a control command that may be selectable whenever the user rotates the body 51 of the input device 5, an execution time of a selected control command, a remaining time of the selected control command being executed, and whether or not the selected control command has ended.

In order to enhance visibility of the information displayed on the projection surface 87, the window 53, located in the body through-hole 511, may have a material or shape such that a size of characters or symbols displayed on the projection surface 87 may be enlarged.

Thus, a thickness or width of the input/output device C may be minimized as the input device 5 is located in a direction in which light emitted from the output device 8 travels, and may advantageously maximize use of the display surface 85 of the output device 8, despite the input device 5 being located above the output device 8, because the user may check the information on the display surface via the input device 5.

Figure 5:
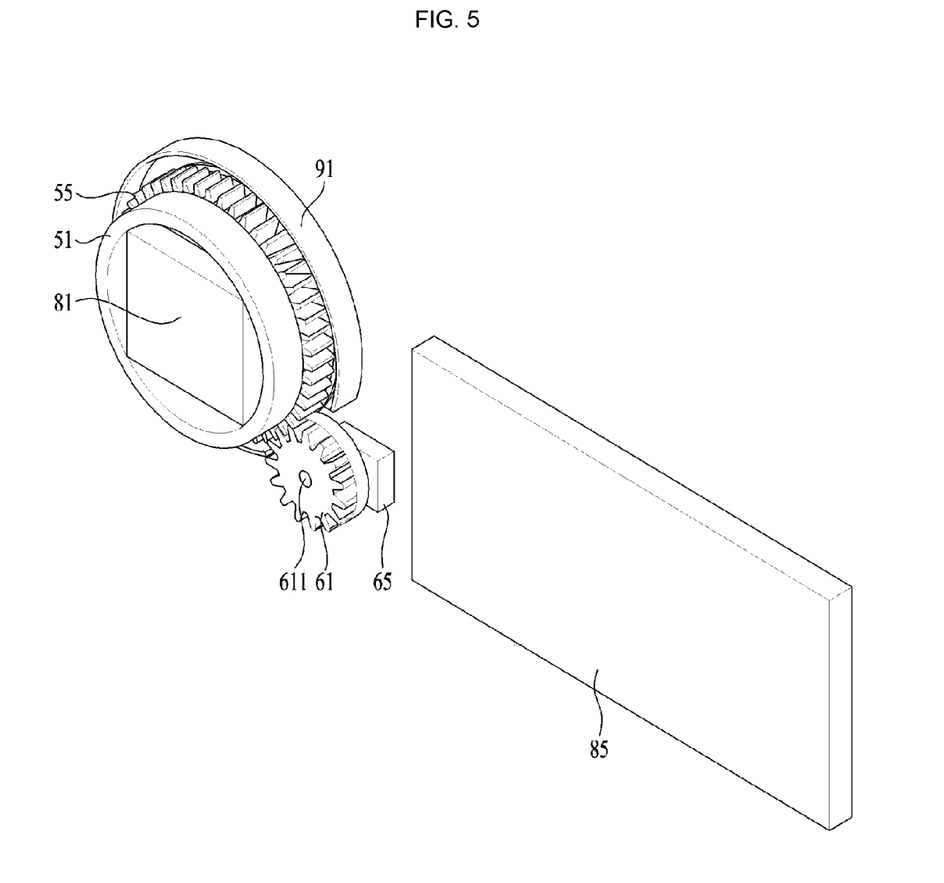
FIG. 5 is a view of an input/output device according to another embodiment.

The output device 8 provided in the input/output device C may be divided into a first display 81 and a second display 85 as illustrated in FIG. 5. The first display 81 may be located inside the body through-hole 511, and the second display 85 may be located outside the body through-hole 511.

The user may check a control command or information displayed on the first display 81 through the body through-hole 511 and the window 53 of the input device 5, and may check a control command or information displayed on the second display 85 through a translucent region of the second housing 4.

As can be appreciated, if the external surface of the output module in FIG. 1 and/or the window 83 of FIG. 3 include prefixed light transmitting labels or etched information, the output device 8 may be a plurality of light emitting elements which may be selectively controlled to highlight an appropriate label or information. Alternatively, if the external surface of the output device and window are transparent surfaces, the output device may be a display panel such that information provided on the display panel is visible through the transparent surface. As can be appreciated, various combinations of labels, etched information, and transparent surfaces are possible in view of the teaching of the present specification.

The above description describes the case where the input/output device C according to embodiments is provided in the laundry treatment apparatus 100, by way of example, but the input/output device C may be applied to any electronic appliance in which the appliance may need to display information to a user upon receiving a control command from the user.

Embodiments disclosed herein provide an input/output device including an input unit or device that may be located in an upper region of a display surface in the direction in which light emitted from the display surface travels, on which a control command or information may be displayed, and may enable a selection or input of a control command.

Embodiments disclosed herein provide an input/output device capable of transmitting a control command or information to a user via an input unit. In addition, embodiments disclosed herein provide an input/output device that may enhance visibility of a control command or information displayed via an input unit. In addition, embodiments disclosed herein provide an input/output device that may require a minimum installation space.

According to embodiments disclosed herein, an input/output device may include an output device or module having a display surface, on which characters or symbols may be displayed, a body rotatably provided above the display surface, a body through-hole formed in the body to allow the display surface to be viewed or visible from an outside of the body, a signal generation unit or device configured to generate a control signal according to whether the body is rotated, and a controller configured to control the output device based on the control signal input from the signal generation device.

The input/output device may further include a window provided in the body through-hole to enlarge the characters or symbols displayed on a projection surface formed as the body through-hole is projected onto the display surface.

The controller may control the output device so that characters or symbols, displayed on a projection surface formed as the body through-hole is projected onto the display surface, may have a different size from a size of characters or symbols displayed outside the projection surface.

The signal generation device may include a first generator configured to generate a control signal when the body is rotated, and a second generator configured to generate a control signal when the body is pushed toward the output device.

The input/output device may further include a first housing to which the output device may be fixed, a second housing spaced apart from the display surface by a prescribed distance, a through-hole formed in the second housing so that the body may be inserted thereinto, and a support unit or support provided at the first housing or the second housing to rotatably support the body.

The support unit may include a support body located between the body and the output device, a support body through-hole formed in the support body so as to communicate with the body through-hole, and a guide provided at the support body to rotatably support the body.

The guide may include an accommodation recess configured to accommodate an outer circumferential surface of the body. The guide may include a first flange provided at the support body to couple the support body to the second housing, the first flange being configured to accommodate an outer circumferential surface of the body, and a second flange provided at the support body so as to be inserted into the body through-hole, the second flange being spaced apart from the first flange by a prescribed distance.

The input/output device may further include a driving gear provided along an outer circumferential surface of the body, and the signal generation device may include a driven gear configured to be engaged with the driving gear and a signal generator configured to generate a control signal according to whether the driven gear is rotated.

The output device may include a first display unit located inside the body through-hole, and a second display unit located outside the body through-hole. The body may be provided in a direction in which light emitted from the display surface travels.

According to embodiments disclosed herein, an input/output device may include a display module having at least a prescribed surface area configured to display at least one of character or symbol, a rotatable body provided to align with the prescribed surface area, a body through-hole formed in the rotatable body to allow the at least one of character or symbol generated by the display module to be visible through the body through-hole, a signal generator configured to generate a control signal based on rotation of the rotatable body, and a controller configured to control a display of at least one of character or symbol by the display module based on the control signal input from the signal generator.

The input/output device may further include a window provided on the body through-hole to enlarge the at least one of character or symbol displayed on the prescribed surface area of the display module.

The controller may control the display so that the at least one of character or symbol provided on the prescribed surface area have a different size from a size of at least one of character or symbol provided outside the prescribed surface area of the display module.

An input/output device according to embodiments may serve not only as means to input a control command to various apparatuses, but also as means to control an output device, such as, e.g., a display device, provided in respective apparatuses to transmit information to a user.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An input/output device, comprising:
   an output device having a display surface on which characters or symbols are displayed;
   a body rotatably provided above the display surface;
   a body through-hole formed in the body to allow a prescribed surface area of the display surface to be visible from an outside of the body;
   a signal generation device configured to generate a control signal according to whether the body is rotated; and
   a controller configured to control the output device based on the control signal input from the signal generation device so that the characters or symbols are displayed in a region outside the prescribed surface area of the display surface, wherein one of the characters or symbols displayed in the region outside the prescribed surface area is highlighted in brightness or size to indicate the one of the characters or symbols to be selectable when the body is rotated by a prescribed reference angle, and the one of the characters or symbols indicated to be selectable is further displayed within the prescribed surface area to be visible through the body through-hole.

2. The input/output device according to claim 1, further including a window provided in the body through-hole to enlarge the characters or symbols displayed on the prescribed surface area.

3. The input/output device according to claim 1, wherein the signal generation device includes:
   a first generator configured to generate a control signal when the body is rotated; and
   a second generator configured to generate a control signal when the body is pushed toward the output device.

4. The input/output device according to claim 1, further including:
   a first housing to which the output device is fixed;
   a second housing spaced apart from the display surface by a predetermined distance;
   a through-hole formed in the second housing so that the body is inserted thereinto; and
   a support device provided at the first housing or the second housing to support the body.

5. The input/output device according to claim 4, wherein the support device includes:
   a support body located between the body and the output device;
   a support body through-hole formed in the support body so as to communicate with the body through-hole; and
   a guide provided at the support body to rotatably support the body.

6. The input/output device according to claim 5, wherein the guide includes an accommodation recess configured to accommodate an outer circumferential surface of the body.

7. The input/output device according to claim 5, wherein the guide includes:
   a first flange provided at the support body to couple the support body to the second housing and configured to accommodate an outer circumferential surface of the body; and
   a second flange provided at the support body so as to be inserted into the body through-hole and spaced apart from the first flange by a predetermined distance.

8. The input/output device according to claim 5, further including a driving gear provided along an outer circumferential surface of the body,
   wherein the signal generation device includes a driven gear configured to be engaged with the driving gear and a signal generator configured to generate a control signal according to whether the driven gear is rotated.

9. The input/output device according to claim 1, wherein the output device includes:
 a first display device located inside the body through-hole; and
 a second display device located outside the body through-hole.

10. The input/output device according to claim 1, wherein the body is provided in a direction in which light emitted from the display surface travels.

11. The input/output device according to claim 1, wherein each of the characters or symbols is sequentially highlighted based on continuous rotation of the body in a prescribed direction in increments of the prescribed reference angle.

12. An input/output device, comprising:
 a display module having a display surface configured to display at least one of a character or symbol;
 a rotatable body provided over the display surface;
 a body through-hole formed in the rotatable body and aligned with a prescribed surface area of the display surface to allow the at least one of character or symbol generated by the display module to be visible through the body through-hole;
 a signal generator configured to generate a control signal based on rotation of the rotatable body; and
 a controller configured to control a display of at least one of character or symbol by the display module based on the control signal input from the signal generator so that when the at least one of the character or symbol displayed in a region outside the prescribed surface area is highlighted in brightness or size to indicate the at least one of the character or symbol to be selectable based on rotation of the rotatable body by a prescribed reference angle, the at least one of the character or symbol that is selectable is displayed within the prescribed surface area to be visible through the body through-hole.

13. The input/output device according to claim 12, further including a window provided on the body through-hole to enlarge the at least one of character or symbol displayed on the prescribed surface area of the display module.

14. The input/output device according to claim 12, wherein at least one of the character or symbol is sequentially highlighted based on continuous rotation of the body in a prescribed direction in increments of the prescribed reference angle.

* * * * *